Feb. 20, 1940. J. J. MORRIS 2,191,284
COOKING APPARATUS
Filed April 24, 1937 5 Sheets-Sheet 3

Inventor
James J. Morris

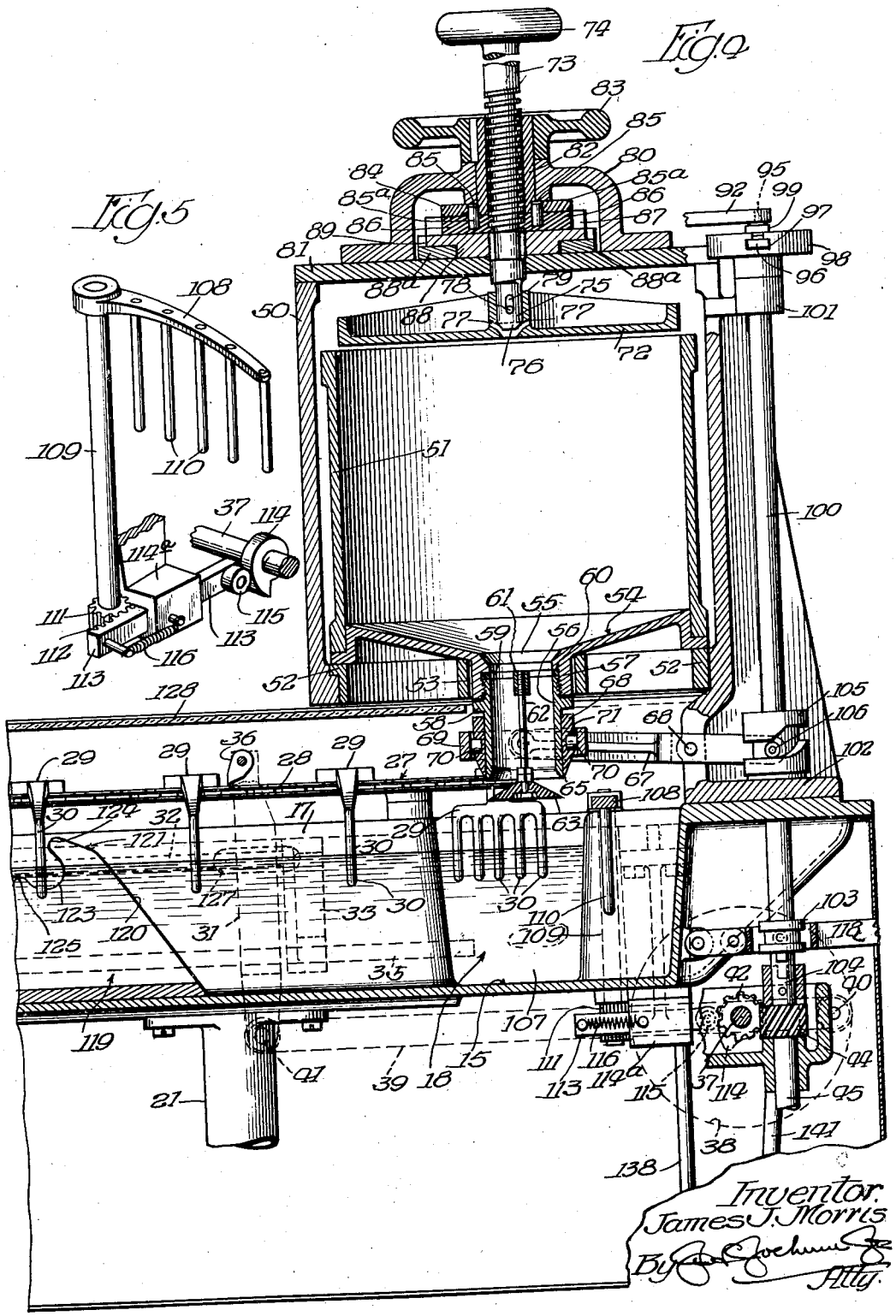

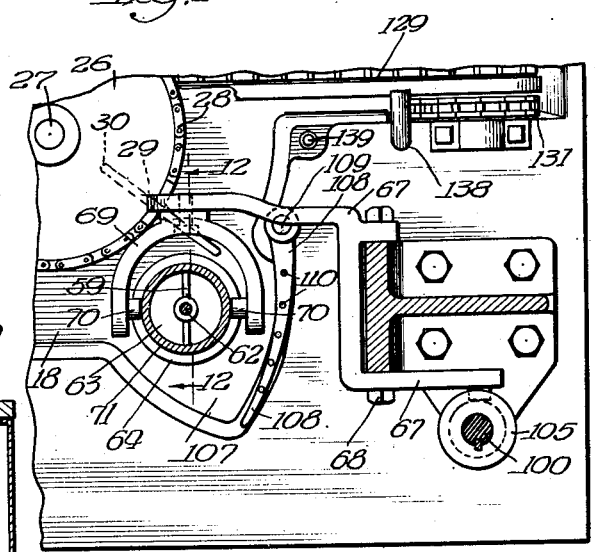
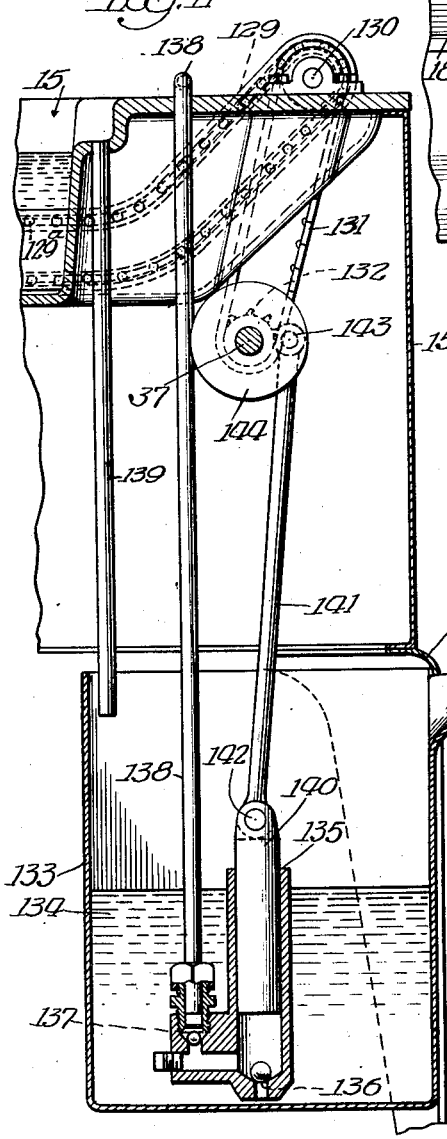
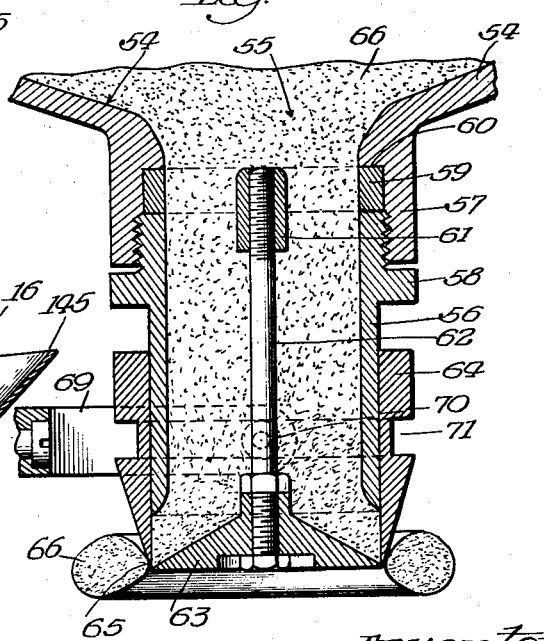

Patented Feb. 20, 1940

2,191,284

UNITED STATES PATENT OFFICE 2,191,284

COOKING APPARATUS

James J. Morris, Chicago, Ill., assignor to Theodore J. Morris, Chicago, Ill.

Application April 24, 1937, Serial No. 138,761

28 Claims. (Cl. 53—7)

This invention relates to improvements in cooking apparatus, particularly adapted though not necessarily limited in its use, for cooking doughnuts and the like, and one of the objects of the invention is to provide an improved machine of this character in which a heated fluid or liquid is employed as a cooking medium to accomplish the cooking, the articles to be cooked being dropped or deposited into the deep cooking medium to be conveyed or advanced therethrough to a point or station at which they will be removed by means of a suitable discharge or delivery mechanism.

A further object is to provide improved means embodying a stationary baffle disposed at any predetermined point in the path of the advancing movement of the article in the cooking medium, for turning the articles over.

A further object is to provide in a machine of this character a hopper or container for containing the dough from which the articles are made, and improved means for feeding the dough to the forming and cutting means.

A still further object is to provide improved means for supporting the hopper or container in a fixed position with relation to the cooking tank or vat, and improved means whereby the hopper or container may be disconnected from certain of its operating mechanism and temporarily shifted to another position to permit it to be refilled or recharged with dough.

A further object is to provide in a machine of this character improved means for positioning the doughnut or article which has been deposited into the cooking tank or vat, into a position to be engaged and advanced by the means which propels the article through the cooking medium.

A further object is to provide in a machine of this character improved means whereby a supply of the cooking medium may be maintained, and from which supply the quantity or level of the cooking medium in the cooking tank or receiver may be maintained substantially constant.

A further object is to provide an improved machine of this character which will be of a comparatively simple, durable, compact and cheap construction, which will be effective and efficient in operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a view in side elevation, partly broken away and partly in section of a machine of this character constructed in accordance with the principles of this invention.

Figure 4 is a detail vertical sectional view taken on line 4—4 Figure 2.

Figure 5 is a detail view partly in perspective and partly broken away, on an enlarged scale, of the ejector for ejecting or placing the article in the cooking receiver or tank, in a position to be engaged and advanced by the advancing mechanism.

Figure 7 is a detail prespective view of one of the sets of fingers of the advancing mechanism for propelling or advancing the article through the cooking medium.

Figures 8 and 9 are schematic views showing the manner in which the article is turned over.

Figure 10 is a detail horizontal sectional view, on an enlarged scale, of a portion of the receiving chamber for the articles and the ejecting mechanism.

Figure 11 is a detail view partly in elevation, and partly in section of the pump mechanism by means of which the supply of cooking medium in the cooking receiver or tank may be maintained substantially constant.

Figure 12 is a detail vertical sectional view, on an enlarged scale taken on line 12—12 Figure 10.

Figures 3, 6:
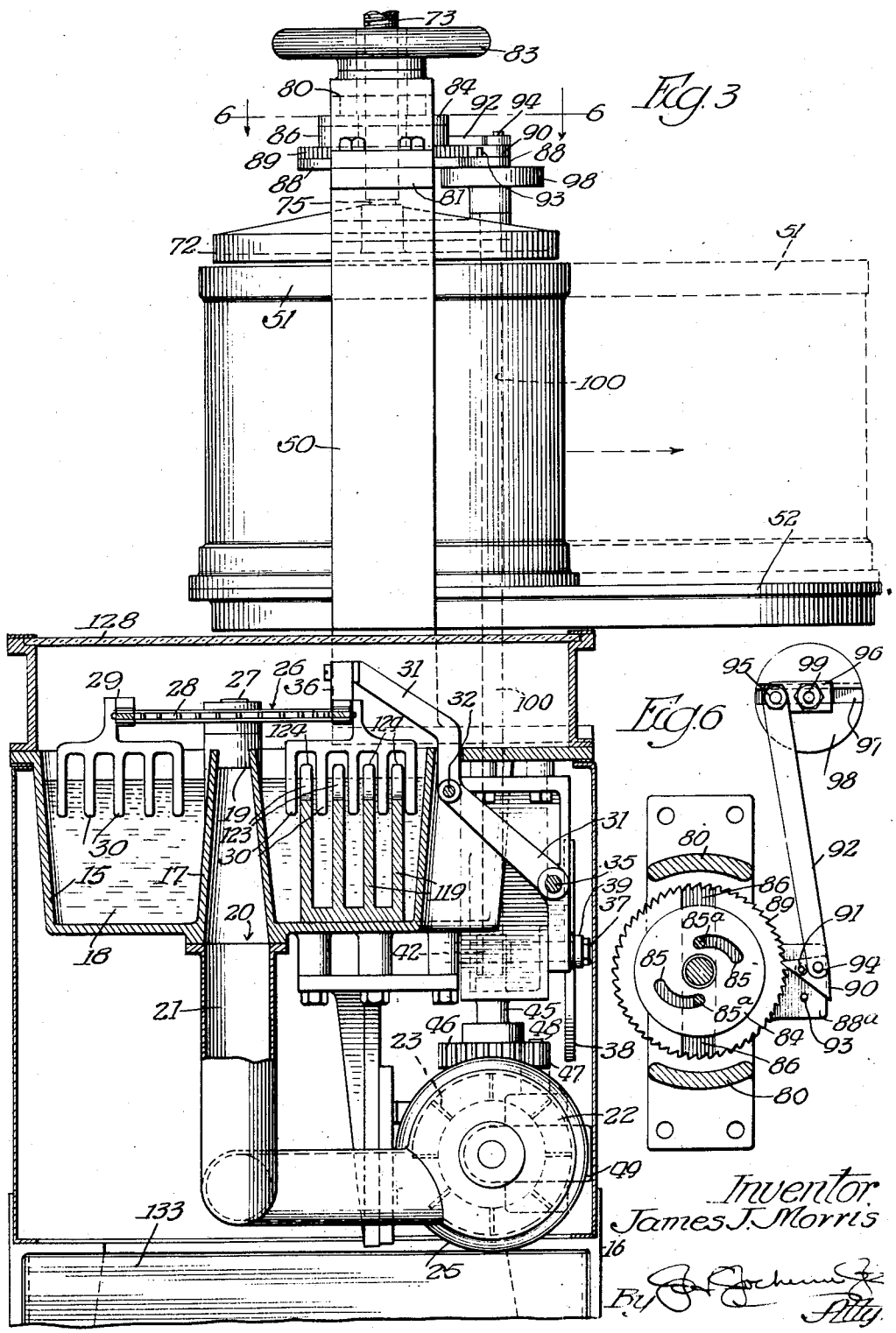
Figure 3 is a view partly in elevation and partly in section taken on line 3—3 Figure 1.
Figure 6 is a detail horizontal sectional view, on an enlarged scale, taken on line 6—6 Figure 3.

Referring more particularly to the drawings, the numeral 15 designates generally a cooking receiver or tank in which the articles are to be cooked and this receiver may be of any desired size and configuration and constructed of any suitable material, it being supported by means of suitable legs or supports 16 arranged in any suitable position with respect to the receiver. The receiver is preferably comparatively long with respect to its width and is of any suitable depth, a hollow partition 17 being arranged to extend lengthwise of the receiver to divide the receiver into two separate channels 18; the partition 17 preferably terminates short of one end of the receiver to provide a portion in the receiver for the reception of other mechanism. This partition 17 preferably terminates substantially flush with the top of the walls of the receiver 15 and is open as at 19, and the bottom of the receiver is provided with an opening 20 (see particularly Figure 3) with which a pipe 21 communicates, and this pipe 21 is also connected with the casing 22 of an exhaust fan 23, the casing 22 being provided with a discharge outlet 24 for the purpose of drawing from the receiver any fumes which may be generated therein and for discharging the same through the discharge outlet 24.

The exhaust fan 23 is operated by means of a motor 25 located in any suitable position, and which motor constitutes the source of power for actuating the various mechanisms. If desired, however, the exhaust fan may be operated in any other suitable manner or by a separate motor (not shown).

The numeral 26 designates sprocket wheels or other suitable pulleys which are mounted to rotate about vertical axes 27, the axis being arranged preferably adjacent the ends of the partition 17, and passing around the sprocket wheels 26 is an endless conveyor 28 of any desired or suitable construction preferably comprising links, the pivots of which are engaged by the teeth of the sprocket wheels for advancing the conveyor. Connected to the conveyor are a series of flights 29, any number of which may be provided, and they may be secured to the conveyor in any suitable manner. The flights preferably comprise a plurality of laterally spaced depending fingers 30 and each of the flights 29 is preferably of a width to extend substantially across the channels 18 and to move within the channels upon the operation of the conveyor.

Motion is imparted to the conveyor to give it an intermittent or step by step movement in any desired or suitable manner.

Figure 1:
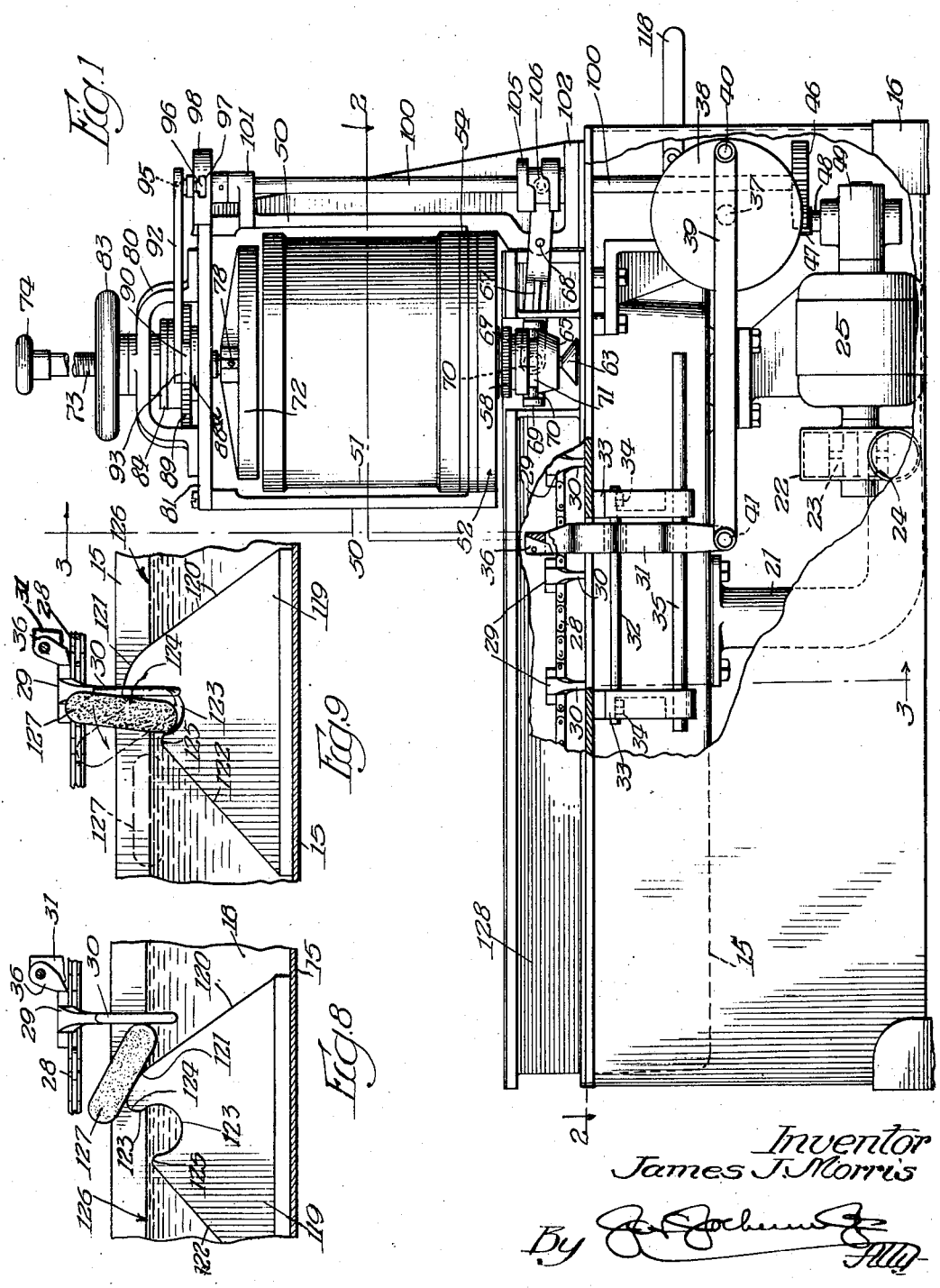

A simple and efficient means embodies an upright member 31 in the form of an arm which is supported by means of a bar or rod 32 passing therethrough and projecting into brackets or bearings 33, the rod 32 being held against movement with respect to the brackets 33 in any desired or suitable manner, such as by means of fastening screws or bolts 34 (see Figure 1). This bar or rod 32 passes freely through the member 31 and secured also to the member 31, projecting therethrough and fastened to the member 31 for movement therewith, is another bar or rod 35 which passes loosely through the brackets 33. This rod 35 is of such a length that while it will slide through the brackets or bearings 33, it will not be disengaged from the brackets 33. The bar or rod 32 co-operates with the bar 35 for supporting and guiding the member 31 in its movement.

The upper end of the member 31 is deflected (see particularly Figure 3) so as to extend over the top of the receiver or tank 15, and also above the conveyor 28. Supported by this end of the member 31 is a pivotally mounted dog or pawl 36 which is adapted to engage behind portions of the flights 29 that are secured to the conveyor 28, so that when the member 31 is moved to the left in Figure 1 and the dog 36 engages behind one of the flights 29, the endless conveyor 28 will be given a step of movement co-extensive with the extent of movement of the member 31. When the member 31 is moved back to its normal position, or retracted, the dog or pawl 36 will engage or pass over that portion of the flight 29 which is secured to the conveyor 28 to pass therebehind, so that upon the next movement of the member 31 in an advancing direction the pawl or dog 36, co-operating with the adjacent flights 29, will move the conveyor and the flights 29 another step of advancing movement through the channels 18.

This reciprocating movement of the member 31 may be accomplished in any desired or suitable manner. A simple and efficient means embodies a shaft 37 mounted in suitable bearings and provided on one end with a disc or crank 38 to which one end of a link 39 is connected as at 40, the other end of the link being connected as at 41 to the member 31, so that when the shaft 37 is rotated the crank or disc 38 will be rotated and through the medium of the link 39 the member 31 will be reciprocated.

Motion may be imparted to the shaft 37 preferably by means of a worm 42 carried thereby which engages a worm 44 carried by a vertical shaft 45 which in turn carries a gear 46 (see particularly Figure 4). Meshing with the gear 46 is a pinion 47 carried by a vertical shaft 48 that is driven from the motor 25 through the medium of suitable interconnecting gearing arranged within a casing 49. The motor 25 may be controlled in any suitable manner (not shown).

Thus when the motor is operating, the shaft 37 will be rotated causing the member 31 to be reciprocated, and this in turn will impart an intermittent or step by step movement to the conveyor 28, for the reason that when the dog or pawl 36 engages behind one of the flights 29 during the forward movement of the member 31, the conveyor will be moved forwardly, but when the member 31 is retracted the conveyor 28 and flights 29 will remain at rest. As the member 31 is retracted the dog or pawl 36 will pass over the adjacent portion of the next flight and upon the next forward movement of the member 31 another step of movement will be imparted to the flights and conveyor.

Projecting above the receptacle 15 and supported in any suitable manner is a frame 50 which is stationary and may be of any desired or suitable construction being open at its front and rear. A hopper or container 51 is arranged within the frame and is adapted to slide upon suitable guides 52. These guides project for any suitable or desired distance laterally beyond the side of the receiver 15 and the guides are preferably in the form of a frame work having an open or slotted portion 53 disposed substantially central thereof.

The bottom 54 of the container 51 is inclined or of an inverted conical configuration, and is provided with a discharge outlet 55 with a depending throat 56 preferably removably connected thereto, and which throat projects through and is movable in the open slotted portion 53.

The throat may be of any suitable construction but is preferably tubular having an end provided with threads engaging in threads in a flange 57 which encompasses the discharge outlet 55. An annular flange 58 may be provided on the throat if desired to form a stop for a purpose to be described. A grid 59 may be provided and positioned between the end of the throat 56 and a shoulder 60 on the flange 57. Secured to the grid in any suitable manner such as by means of one end thereof being threaded into a bearing 61, is a rod 62 of a length to project for any desired distance beyond the free end of the throat 56. Secured to this free end of the rod 62, in any suitable manner, is a conical member 63, the base of which is of a diameter substantially equal to the external diameter of the throat 56. A sleeve 64 is reciprocable upon the throat 56, the lower edge of which is reduced as at 65 to form a knife or cutting edge which co-operates with the peripheral portion of the conical member 63 to sever the dough or material 66 which is forced from the throat 56 and between the lower extremity thereof and the adjacent portion of the conical member 63, as shown more clearly in Figure 12.

Figure 2:
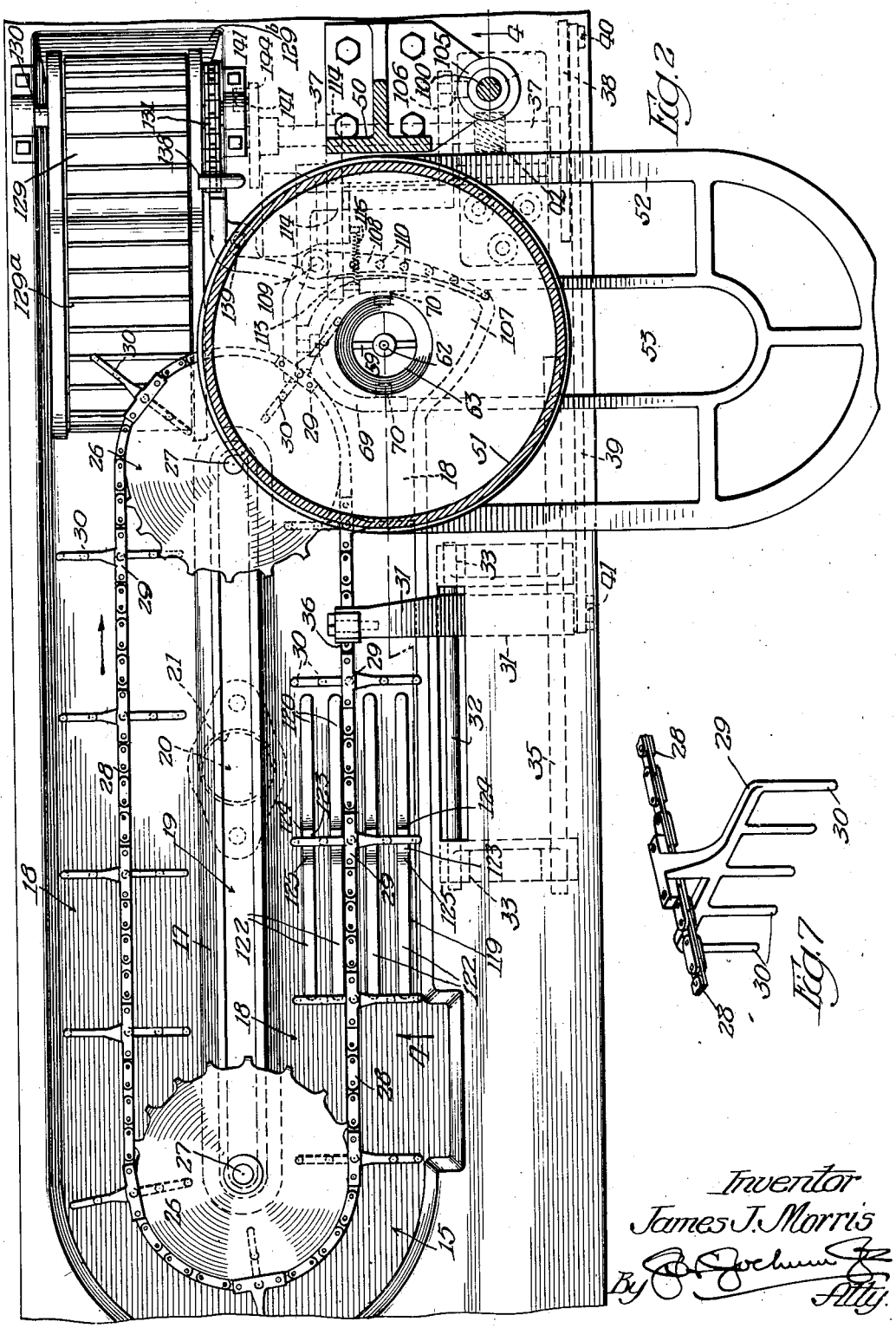
Figure 2 is an irregular horizontal sectional view taken on line 2—2 Figure 1.

The sleeve 64 is reciprocable upon the throat 56 by means of a lever 67 pivotally supported intermediate its ends as at 68. To one end of this lever 67 is connected an open yoke 69 having pins 70 which project into an open peripheral groove 71 in the sleeve. The open portion of the yoke 69 is faced in the direction of the extended portions of the guides 52 upon which the container 51 moves, so that when the container 51 is moved from a position where the throat discharges into the receiver 15 (see Figures 2, 3 and 4) to the position shown in dotted lines in Figure 3, the sleeve 64 together with the throat 56 will be moved out of the yoke so as not to interfere with such movement of the container.

The container is moved to this position so as to permit a refilling of the same. When the container is then moved back to the position shown in Figure 2, the pins or projections 70 on the yoke 69 will enter the groove 71.

A plunger 72 is provided for operating in the container 51 to eject or force the material therefrom through the discharge outlet. This plunger is supported by means of a non-rotatable screw 73 which may be provided with a handle or lifting knob 74. The lower end of the screw is preferably reduced as at 75 and the extremity of the reduced portion is shaped to form a valve 76 adapted to control openings 77 through the plunger. Connection between the plunger 72 and the screw 73 may be made in any suitable manner such as by means of a pin 78 engaging the plunger and passing through a slot 79 in the reduced end 75 of the screw 73.

A yoke or bearing 80 is supported by the cross member 81 of the frame 50 and within this yoke or bearing is an upright rotatable unthreaded sleeve or member 82 to which is connected a hand wheel 83 which latter rests upon the yoke and forms a support for the member 82. Connected to the member 82 so as to rotate therewith is a disc 84 provided with slots 85 (see particularly Figures 4 and 6) into which slots pins 85—A project. These pins are secured to co-operating members 86 that are movable in a slot 87 in a member 88, the latter being supported for rotation upon a bearing member 88—A mounted upon the member 81, and is provided with an unthreaded opening through which the screw 73 loosely passes. The inner faces of the nut members 86 are provided with threads adapted to engage in threads of the screw 73 so that when the member 88 is rotated, in a manner to be described, the nut members 86 will also be rotated while the screw 73 is maintained against rotation. The result will be that upon rotation of the member 88 the screw 73 will be moved longitudinally and the plunger 72 advanced or retracted according to the direction of rotation of the member 88.

The hand wheel 83 is provided so as to move the nut members 86 toward or away from each other. This will be accomplished by reason of the fact that when the member 84 which contains the slots 85 is rotated by means of the hand wheel 83, the pins 85—A riding in these slots will cause the members 86 to be moved towards each other into engagement with the screw 73 so as to advance the plunger 72, or to move away from each other so as to separate the members 86 causing them to disengage the threads of the screw 73 thereby permitting the plunger 72 to be raised by means of the handle 74 with respect to the container 51.

When the plunger 72 is forced downwardly in the container 51 the material will be extruded or forced therefrom, and when all of the material has been discharged the plunger 72 is raised by the handle 74.

Inasmuch as the plunger closely fits the container 51 it will be manifest that ordinarily a suction would be created by the raising of the plunger, within the container.

In order to break this suction the valve 76 and openings 77 in the plunger are provided.

As the plunger is raised by the handle 74 the lower end of the slot 79 will engage the pin 78 and the valve 76 will be unseated with respect to the openings 77.

When, however, the plunger 72 is lowered, its lowering movement being resisted by the contents of the container 51, the valve 76 will be seated and the openings 77 closed.

The plunger is preferably intermittently lowered by imparting an intermittent movement to the member 88 by means of teeth 89 on the periphery thereof adapted to be engaged by a pawl 90. This pawl 90 is mounted upon an extension of the member 88ª. The pawl is moved about a pivot 91 by means of a link 92 and a stop device 93 is provided to limit the pivotal movement of the pawl in one direction.

The link 92 is pivotally connected as at 94 to the pawl. The other end of the link is pivotally connected as at 95 to a block 96 which is movable in a groove 97 in a disc 98, the block 96 being secured against movement in such groove by means of a clamping nut 99. The disc 98 is secured to a vertical shaft 100 journaled in suitable bearings 101—102, and the axis of the shaft 100 is arranged in alinement with the axis of the shaft 45, co-operating clutch members 103—104 being carried by the respective shafts 100—45. The clutch member 103 is movable longitudinally on the shaft 100 into and out of engagement with the clutch member 104 to effect an operative connection between these shafts and to disconnect them so that at certain stages in the operation of the apparatus the shaft 100 will be maintained against rotation while the shaft 45 is rotated.

Carried by the shaft 100 to rotate therewith is a cam 105 in the grove of which cam a roller 106 on the free end of the member or lever 67 operates, so that upon rotation of the shaft 100 the lever 67 will be rocked about its pivot 68, with the result that the sleeve 64 will be raised and lowered with respect to the conical member 63.

When the container 51 is to be shifted laterally out of position, for refilling, the plunger 72 is raised to the position shown in Figure 4, to permit such movement of the container.

The throat 56 in the normal position of the container 51 discharges into a chamber 107 (see particularly Figure 10), which latter has communication with the channel 18 and arranged within this chamber 107 is an ejector 108 (see particularly Figures 4, 5 and 10) that is secured to the end of a vertical shaft 109. The ejector 108 may be of any desired configuration but is preferably slightly curved and is provided with a plurality of depending fingers 110. The shaft is journaled in suitable bearings and projects through and below the bottom of the receiver 15. A pinion gear 111 is secured to the shaft and is engaged by teeth 112 on a rack bar 113, the latter sliding in a suitable bearing 114—A. Secured to the shaft 37 to rotate therewith is a cam 114 with which a roller 115 on the rack bar 113 engages. A spring 116 tends normally to move the rack bar 113 in a direction to move and hold the roller 115 in contact with the cam 114.

In the normal position of the ejector 108 it will be retracted and will stand to one side of the throat 56 of the container 51 so that the article which is formed and dropped into the chamber 107, will be disposed in advance of the fingers 110 of the ejector.

As the chamber 107 has communication with the channel 18, it will be manifest that when the ejector 108 is operated, the fingers 110 will engage the article and move it into a position to be engaged by the fingers 30 on one of the flights 29 to be thereby moved into the channel 18.

Inasmuch as the cam 114 is secured to the shaft 37 for rotation therewith, the rotation of the shaft will cause the rotation of the cam and this in turn assisted by the spring 116 will cause a reciprocatory movement of the rack bar 113 and an oscillatory movement of the ejector 108.

By shifting the clutch 103 by means of a suitable lever 118 the mechanism for advancing the plunger 72 and for actuating the sleeve 64 will be disconnected from the source of power, and these parts will remain inactive while the operating mechanism for the conveyor 28 and the flights 29 will remain active.

The articles as they are conveyed through the channels 18, after they have been in the hot cooking medium for a predetermined length of time with respect to their travel, are turned over and this is accomplished by means of turning mechanism consisting essentially of a series of stationary barriers 119 which preferably consist of a plurality of laterally spaced members comparatively thin with relation to their other dimensions. Each of these members 119 may be of any desired configuration but is preferably of a somewhat conical shape having an inclined surface 120 disposed within the path of and opposed to the advancing movement of the article. The upper portion of this surface 120 is preferably disposed at an angle to the latter and arranged in the face 122 which is opposite to the face 120, and opening in the direction of the travel of the article is recess 123. This recess is so shaped as to provide spaced fulcrums 124—125, each of the members 119 being of a height to project for a considerable distance above the level of the cooking medium which level is indicated by the reference numeral 126 in Figures 8 and 9.

Before the articles 127 reach the turning elements 119 they float in the cooking medium and are advanced therethrough by means of the fingers 30 of the flights 29. These flights will continue to move the article until the article engages the inclined surface 121 of the elements 119, as shown in Figure 8 and until the article is moved over such face 121 to a sufficient extent that the article will become overbalanced and will turn upon the fulcrum 124, causing the forward edge of the article to fall into the recess 123, as shown in Figure 9. Just at this time the conveyor 28 and the flight 29 which move the article to this position, will be arrested in their movement by reason of the intermittent or step by step movement which is imparted to the conveyor 28.

The article will then fall by gravity turning in the recess 123 (see Figure 9) and also turning about the fulcrum 125 to fall back, in a flat position, into the cooking medium in the receiver 15, as shown in dotted lines in Figure 9.

Thus it will be seen that the articles will be automatically turned partially by gravity, and through the medium of the stationary elements or members 119.

While in the present form of the invention only one series of these stationary turning elements 119 is shown, it is of course to be understood that they may be arranged at any desired points, along the line of travel of the article through the cooking medium.

A closure 128, of any desired or suitable construction, a portion only of which may be constructed of transparent material is provided for the receiver 15 so as to permit a view of the articles and of the operation of the mechanism during the cooking operation.

Any fumes or vapor generated within the container will be drawn out by the suction fan 23.

After the cooking operation has been completed the articles may be removed by means of an elevator 129 of any suitable construction but preferably of an endless conveyor type that is arranged adjacent the outlet end of the channel 18. This elevator may be of any desired construction and a portion 129a thereof extends into the receiver 15 and along the bottom of the receiver for a suitable distance, terminating adjacent and in the path of movement of the fingers 30 of the flights 29, so that as the articles are advanced through the channel 18 they will be passed over the horizontal portion 129a of the conveyor 129b of the receiver 15; the elevator is operated preferably by means of a shaft 130 having a sprocket wheel secured thereto over which a sprocket chain 131 passes. The sprocket chain also passes over another sprocket wheel 132 which is secured to the shaft 37 for rotation therewith.

Means are provided whereby the height of the cooking medium in the receiver 15 may be maintained at a substantially constant level.

This may be accomplished in the following manner: A supply tank 133 is arranged in any convenient position preferably supported beneath the receiver 15 and contains a supply of the cooking medium 134. Within this tank is arranged a pump 135 having a valve controlled inlet 136 and a valve controlled outlet 137. To this outlet 137 is connected a pipe 138 which discharges into the receiver 15 and an overflow pipe 139 leads from the receiver and discharges back into the tank 133.

In the pump 135 is a plunger 140 to which one end of a link 141 is pivotally connected as at 142 and the other end of the link is pivotally connected as at 143 to a disc or crank 144 that is secured to the shaft 37 for rotation therewith.

A fill opening 145 may be provided for the tank 133.

Thus it will be seen that while the shaft 37 is operating, the pump 135 will also be operating to constantly pump the cooking medium 134 from the tank 133 and to deliver the same into the cooking receiver, the overflow pipe 139 causing any excess quantity of the cooking medium to flow back into the supply tank 133.

The plunger 72 is fed downwardly in the container 51 to extrude the material, by a step by step movement, through the medium of the oscillation of the member 88 and the dog or pawl 90, co-operating with the teeth 89 of the member which supports the nut elements 86, the plunger moving downwardly a predetermined distance upon each step of bodily rotating movement imparted to the nut members, in one direction. Therefore in order to vary such movement of the plunger 72, it is only necessary to vary the extent of oscillation of the member 88 which carries the pawl 90.

This is accomplished by adjusting the block 96 in the groove 97 in the disc 98 to move the pivot 95 between the link 92 and the block 96 toward or away from the axis of rotation of the disc 98, according to the distance it is desired to have the conveyor move upon each advancing movement of the arm or member 31.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A cooking apparatus embodying a receptacle containing a hot cooking medium, means for advancing through the cooking medium the articles deposited thereinto, and stationary means arranged in the path of movement of the articles by said advancing means and co-operating therewith for turning over the articles.

2. A cooking apparatus embodying a receptacle containing a hot cooking medium, means for advancing through the cooking medium the articles deposited thereinto, and stationary means arranged in the path of movement of the articles by said advancing means and co-operating therewith for turning over the articles, the said stationary means being disposed entirely within the said receptacle and projecting only a short distance above the top of the cooking medium.

3. A cooking apparatus embodying a receptacle containing a hot cooking medium, means for advancing through the cooking medium the articles deposited thereinto, and stationary means arranged in the path of movement of the articles by said advancing means and co-operating therewith for turning over the articles, the said stationary means comprising a baffle having its face which is adjacent the advancing article inclined, the opposite face of said baffle having an open recess spaced from the top of the baffle and opening in the direction of the line of travel of the article through the cooking medium and positioned to receive an edge of the article for turning over the article.

4. A cooking apparatus embodying a receptacle containing a hot cooking medium, means for advancing through the cooking medium, the articles deposited thereinto, and stationary means arranged in the path of movement of the articles by said advancing means and co-operating therewith for turning over the articles, the said stationary means comprising a baffle having its face which is adjacent the advancing article inclined, the opposite face of said baffle having an open recess spaced from the top of the baffle and opening in the direction of the line of travel of the article through the cooking medium and positioned to receive an edge of the article for turning over the article, said baffle embodying a plurality of elements spaced laterally across the path of advancement of the articles, and said advancing means embodying fingers passing between said elements.

5. A cooking apparatus embodying a receptacle containing a hot cooking medium, means for advancing through the cooking medium the articles deposited thereinto, stationary means arranged in the path of movement of the articles by said advancing means and co-operating therewith for turning over the articles, and means for intermittently actuating said advancing means, the movement of said advancing means being interrupted as the article is turning over.

6. A cooking apparatus embodying a receptacle for containing a hot liquid cooking medium, mechanism for turning over articles after they have been in said cooking medium for a predetermined length of time, a closure for the receptacle, and means for exhausting through the bottom of the receptacle and carrying away the fumes generated in the receptacle.

7. A cooking apparatus embodying a cooking receptacle containing a hot liquid cooking medium, a container for containing the material to be cooked, means for supporting said container above the receptacle and in a position to discharge into the receptacle, means for causing the material to be discharged into the receptacle, and means supporting said container for bodily sliding movement to another position with respect to the said receptacle.

8. A cooking apparatus embodying a cooking receptacle for containing a hot liquid cooking medium, means for advancing the articles through said cooking medium, the said means embodying a member movable lengthwise of the receptacle, a slide separate from the said member, a pivoted dog carried with the slide and engageable with a portion of said member to move the latter, a container supported to discharge into said receptacle, a former associated with said container, means for forcing the material from said container and through said former to be delivered into said receptacle, a common driving mechanism for actuating said advancing means and said forcing means, and means individual to said forcing means for rendering the latter inactive while the said slide remains active.

9. A cooking apparatus embodying a cooking receptacle for containing a hot liquid cooking medium, means for advancing the articles through said cooking medium embodying a member movable lengthwise of the receptacle, a slide outside of the receptacle, a pawl carried by the slide and engageable with said member for moving it, a container supported to discharge into said receptacle, a former associated with said container, means for forcing the material from said container and through said former to be delivered into said receptacle, a common driving mechanism for reciprocating said slide and operating said forcing means, and means individual to said forcing means for rendering the latter inactive while the said slide remains active, the actuating means for said forcing means embodying pawl and ratchet mechanism, whereby an intermittent operation will be imparted to said forcing means.

10. A cooking apparatus embodying a cooking receptacle for containing a hot liquid cooking medium, a member for advancing the articles through said cooking medium, a slide, means for reciprocating the slide, a dog pivotally supported by the slide and adapted to intermittently engage said member to advance it, a container supported to discharge into said receptacle, a former associated with said container, means for forcing the material from said container and through said former to be delivered into said receptacle, a source of power disposed below said container, operative connections individual to and connecting said slide and said forcing means with said source of power, and means individual to said forcing means for rendering the latter inactive with respect to said source of power while the said slide remains active with respect to the said source of power.

11. A cooking apparatus embodying a cooking receptacle for containing a hot liquid cooking medium, intermittently movable means for engaging and advancing the articles in said medium, stationary means located at a predetermined point along and disposed within the path of travel of the articles for turning over the individual articles, a source of supply of said cooking medium, and means operating to maintain from said supply the cooking medium in said receptacle at a substantially constant level.

12. A cooking apparatus embodying a cooking receptacle for containing a hot liquid cooking medium, means for engaging and advancing the articles in said medium, and stationary means located at a predetermined point along and disposed within the path of travel of the articles for turning them over, the said stationary turning means and the article engaging portion of the said advancing means being laterally displaced one with respect to the other to permit them to pass each other.

13. A cooking apparatus embodying a cooking receptacle for containing a hot liquid medium, intermittently movable means for engaging and advancing the articles in said medium, stationary means located at a predetermined point along and disposed within the path of travel of the articles for turning over the individual articles, a source of supply of said cooking medium, and means operating to maintain from said supply the cooking medium in said receptacle at a substantially constant level, the said stationary means embodying a barrier having an opening faced in the direction of travel of the article and into which opening a portion of the article falls while being turned and while the advancing means is at rest, the ends of the walls of said opening successively forming fulcrums about which the articles move as they are being turned over.

14. A cooking apparatus embodying a cooking receptacle for containing a hot liquid medium, intermittently movable means for engaging and advancing the articles in said medium, stationary means located at a predetermined point along and disposed within the path of travel of the articles for turning over the individual articles, a source of supply of said cooking medium, and means operating to maintain from said supply the cooking medium in said receptacle at a substantially constant level, the said stationary means embodying a barrier having an opening faced in the direction of travel of the article and into which opening a portion of the article falls while being turned and while the advancing means is at rest, the ends of the walls of said opening successively forming fulcrums about which the articles move as they are being turned over, one of said fulcrums being maintained below the level of the cooking medium and the other of said fulcrums projecting for a short distance above the said cooking medium level.

15. A cooking apparatus embodying a cooking receptacle for containing a hot liquid medium, intermittently movable means for engaging and advancing the articles in said medium, stationary means located at a predetermined point along and disposed within the path of travel of the articles for turning over the individual articles, a source of supply of said cooking medium, and means operating to maintain from said supply the cooking medium in said receptacle at a substantially constant level, the said advancing means embodying an endless flexible traveling conveyor element supported above the level of the heating medium, and fingers connected to and depending from said element, said fingers engaging and moving the articles until the articles reach the stationary turning means, the articles turning by gravity with respect to said stationary means.

16. A cooking apparatus embodying a cooking receptacle containing a hot liquid cooking medium, a container for containing the material to be cooked, means for supporting said container above the receptacle in a position to discharge into the receptacle, means for causing the material to be discharged into the receptacle, and means for supporting said container for bodily sliding movement to another position with respect to said receptacle, thereby adapting said container for free removal from the machine.

17. A cooking apparatus embodying a cooking receptacle for containing a hot liquid cooking medium, intermittently movable means for engaging and advancing the articles in said medium, stationary means located at a predetermined point along and disposed within the path of travel of the articles for turning over the individual articles, the said stationary means embodying a barrier having an opening faced in the direction of travel of the article and into which opening a portion of the article falls while being turned and while the advancing means is at rest, the ends of the walls of said opening successively forming fulcrums about which the articles move as they are being turned over.

18. A cooking apparatus embodying a cooking receptacle for containing a hot liquid cooking medium, intermittently movable means for engaging and advancing the articles in said medium, stationary means located at a predetermined point along and disposed within the path of travel of the articles for turning over the individual articles, the said stationary means embodying a barrier having an opening faced in the direction of travel of the article and into which opening a portion of the article falls while being turned and while the advancing means is at rest, the ends of the walls of said opening successively forming fulcrums about which the articles move as they are being turned over, one of said fulcrums being maintained below the level of the cooking medium and the other of said fulcrums projecting for a short distance above the said cooking medium level.

19. A cooking apparatus embodying a cooking receptacle for containing a hot liquid cooking medium, means for advancing through the cooking medium the articles deposited therein, and stationary means arranged in the path of movement of the articles by said advancing means for turning over the articles, the said stationary means having an opening faced in the direction of travel of the articles and into which opening a portion of the article falls while being turned.

20. A cooking apparatus embodying a cooking receptacle for containing a hot liquid cooking medium, means for advancing through the cooking medium the articles deposited therein, and stationary means arranged in the path of movement of the articles by said advancing means for turning over the articles, the said stationary means having an opening faced in the direction of travel of the articles and into which opening a portion of the article falls while being turned and while the advancing means is at rest.

21. A cooking apparatus embodying a cooking receptacle for containing a hot liquid cooking medium, intermittently movable means for engaging and advancing the articles in said medium, and stationary means located at a predetermined point along and disposed within the path of travel of the articles for turning over the individual articles, the said advancing means embodying an endless flexible travelling conveyor element supported above the level of the heating medium, and fingers connected to and depending from said element, said fingers engaging and moving the articles until the articles reach the stationary turning means, the articles turning by gravity with respect to said stationary means.

22. A cooking apparatus embodying a cooking receptacle for containing a hot liquid cooking medium, a member for advancing the articles through the cooking medium, a slide arranged outside of said receptacle, an arm carried by the slide and positioned to extend over the receptacle, means connecting the arm with said member to advance the latter when the slide is moved in one direction, and means for reciprocating the slide.

23. A cooking apparatus embodying a cooking receptacle for containing a hot liquid cooking medium, means for advancing the articles through said medium, said means embodying an endless flexible member, a slide mounted outside of said receptacle, an arm connected with the slide and extending over the top of the receptacle, a pivoted member carried with the arm and adapted to be operatively connected with said member to advance the latter when the slide is moved in one direction, and means for reciprocating the slide while the direction of movement of said member remains constant.

24. A cooking apparatus embodying a receptacle for containing a hot liquid cooking medium, a cover for the receptacle, means for advancing the articles through said cooking medium, said receptacle embodying a hollow wall open at the top, and an exhaust mechanism connected with said hollow wall for exhausting and carrying away from the receptacle and through said wall the fumes generated in the receptacle.

25. A cooking apparatus embodying a receptacle for containing a hot liquid cooking medium, means travelling in the receptacle for advancing the articles through the cooking medium, means for depositing into the receptacle the articles to be cooked, said articles being deposited in the receptacle out of the line of travel of the said advancing means, an ejector mounted for movement on a vertical pivot, said ejector engaging and positioning the article to be advanced by the said advancing means, and means for oscillating said ejector, the last said means embodying a gear and rack construction and means for reciprocating the rack.

26. A cooking apparatus embodying a receptacle for containing a hot liquid cooking medium, means travelling in the receptacle for advancing the articles through the cooking medium, means for depositing into the receptacle the articles to be cooked, said articles being deposited in the receptacle out of the line of travel of the said advancing means, an ejector mounted for movement on a vertical pivot, said ejector engaging and positioning the article to be advanced by the said advancing means, and means for oscillating said ejector, the last said means embodying a gear and rack construction, means embodying a cam device for moving the rack in one direction, and means for moving the rack in the opposite direction.

27. A cooking apparatus embodying a receptacle for containing a hot liquid cooking medium, means traveling in the receptacle for advancing the articles through the cooking medium, means for depositing into the receptacle and out of the line of travel of said advancing means the articles to be cooked, an ejector mounted for movement on a vertical pivot and embodying an arm supported by one end, laterally spaced fingers depending from said arm for engaging and moving the article into a position to be advanced by the said advancing means, and means for oscillating said ejector about its pivot.

28. A cooking apparatus embodying a receptacle for containing a hot liquid cooking medium, means traveling in the receptacle for advancing the article through the cooking medium, means for depositing into the receptacle and out of the line of travel of said advancing means the article to be cooked, an ejector mounted for movement on a vertical pivot and embodying an arm supported by one end, the said pivot and the said arm being disposed outside of the receptacle and the said arm projecting over the receptacle, laterally spaced fingers depending from said arm and projecting into the receptacle for engaging and moving the article to a position to be advanced by the said advancing means, and means for oscillating said ejector about its pivot.

JAMES J. MORRIS.